United States Patent
Ittemann et al.

(10) Patent No.: US 6,380,306 B1
(45) Date of Patent: Apr. 30, 2002

(54) THERMOPLASTIC MOLDING COMPOUNDS

(75) Inventors: Peter Ittemann, Lampertheim; Rainer Neumann, Mutterstadt; Joachim Seibring, Freinsheim; Bernhard Rosenau, Neustadt; Manfred Kötting, Mutterstadt; Christophe Ginss, Weinheim; Norbert Güntherberg, Speyer; Christian Meyer, Weiterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/269,338

(22) PCT Filed: Sep. 12, 1997

(86) PCT No.: PCT/EP97/05001

§ 371 Date: Mar. 25, 1999

§ 102(e) Date: Mar. 25, 1999

(87) PCT Pub. No.: WO98/13420

PCT Pub. Date: Apr. 2, 1998

(30) Foreign Application Priority Data

Sep. 26, 1996 (DE) .......................................... 196 39 592

(51) Int. Cl.[7] .............................. C08L 9/00; C08L 51/00
(52) U.S. Cl. ......................................... 525/86; 524/504
(58) Field of Search .............................. 525/86; 524/504

(56) References Cited

FOREIGN PATENT DOCUMENTS

| | | |
|---|---|---|
| DE | 1 260 135 | 2/1968 |
| DE | 24 27 960 | 6/1975 |
| DE | 29 01 576 | 7/1980 |
| EP | 011 158 | 5/1980 |
| EP | 052 732 | 6/1982 |
| EP | 074 051 | 3/1983 |
| EP | 712 894 | 5/1996 |

*Primary Examiner*—Peter D. Mulcahy
(74) *Attorney, Agent, or Firm*—Keil & Weinkauf

(57) ABSTRACT

Thermoplastic molding materials of

A) from 72 to 88.5% by weight of a thermoplastic styrene or α-methylstyrene polymer or copolymer, B) from 10 to 20% by weight of a first graft polymer having an average particle diameter $d_{50}$ from 400 to 600 nm, having an n-butyl acrylate based rubber-elastic graft core, and a styrene or α-methylstyrene (co)polymer graft shell, C) from 1.5 to 8% by weight of a second graft polymer having a bimodal particle size distribution, the average particle diameter $d_{50}$ being from 25 to 200 nm and from 350 to 550 nm, having a butadiene or isoprene polymer or copolymer based rubber-elastic graft core, and a styrene or α-methylstyrene (co)polymer graft shell, D) from 0 to 50% by weight of conventional additives, where the graft polymers B) and C) constitute from 11.5 to 25% by weight of components A), B) and C), and components A) to D) amount to 100% by weight.

20 Claims, No Drawings

THERMOPLASTIC MOLDING COMPOUNDS

The present invention relates to thermoplastic molding materials containing, based on the total weight of the molding material, A) from 72 to 88.5% by weight of a thermoplastic polymer of, based on A),
  a1) from 50 to 100% by weight of styrene or α-methylstyrene or mixtures thereof,
  a2) from 0 to 50% by weight of acrylonitrile and,
  a3) from 0 to 50% by weight of one or more further monoethylenically unsaturated monomers, B) from 10 to 20% by weight of a first graft polymer having an average particle diameter $d_{50}$ from 400 to 600 nm, comprising, based on B),
  b1) from 30 to 90% by weight of a rubber-elastic graft core of, based on b1),
    b11) from 80 to 99.99% by weight of n-butyl acrylate,
    b12) from 0.01 to 20% by weight of at least one crosslinking monomer and,
    b13) from 0 to 40% by weight of one or more further monoethylenically unsaturated monomers, and
  b2) from 10 to 70% by weight of a graft shell of, based on b2),
    b21) from 50 to 100% by weight of styrene or α-methylstyrene or mixtures thereof,
    b22) from 0 to 50% by weight of acrylonitrile and
    b23) from 0 to 50% by weight of one or more further monoethylenically unsaturated monomers, C) from 1.5 to 8% by weight of a second graft polymer having a bimodal particle size distribution, the average particle diameter $d_{50}$ being from 25 to 200 nm on the one hand and from 350 to 550 nm on the other hand, comprising, based on C),
  c1) from 30 to 90% by weight of a rubber-elastic graft core of, based on c1),
    c11) from 50 to 100% by weight of butadiene or isoprene or mixtures thereof, and
    c12) from 0 to 50% by weight of one or more further monoethylenically unsaturated monomers, and
  c2) from 10 to 70% by weight of a graft shell of, based on c2),
    c21) from 50 to 100% by weight of styrene or α-methylstyrene or mixtures thereof,
    c22) from 0 to 50% by weight of acrylonitrile and,
    c23) from 0 to 50% by weight of one or more further monoethylenically unsaturated monomers and D) from 0 to 50% by weight of lubricants or mold release agents, pigments, dyes, flameproofing agents, antioxidants, light stabilizers, fibrous or particulate fillers or reinforcing materials or antistatic agents or other additives, or mixtures thereof, the sum of the graft polymers B) and C) accounting for from 11.5 to 25% by weight of the sum of the three components A), B) and C)
and the sum of the four components A) to D) being 100% by weight.

The present invention furthermore relates to the use of the thermoplastic molding materials for the production of special shaped articles and to the special shaped articles produced from the thermoplastic molding materials.

Shaped articles of ABS (polybutadiene rubber particles, grafted with polystyrene/acrylonitrile, in polystyrene/acrylonitrile matrix) are distinguished by good mechanical properties, in particular—due to the low glass transition temperature Tg of the polybutadiene—by good impact strengths even at low temperatures.

It has been found that it is advantageous for the production of shaped articles, in particular by injection molding process, if small and large rubber particles are present in the ABS molding material. Such molding materials are described, for example, in German laid-open application DOS 2,427,960. Injection molded articles which have complex geometries, for example housing parts and front panels for appliances, electric switches, switches and installation boxes, can particularly advantageously be produced from molding materials having such a bimodal particle size distribution of the rubber, owing to their good flowability.

The disadvantage of shaped articles of ABS is that their stability to light, oxygen and other weathering influences is not completely satisfactory, owing to the presence of double bonds in the polybutadiene. When exposed to the weather, ABS shaped articles therefore tend in some cases to exhibit discoloration of the surface due to yellowing and chalking. Furthermore, the mechanical properties, in particular the impact strength, may deteriorate.

Shaped articles of ASA (polyalkyl acrylate rubber particles, grafted with polystyrene/acrylonitrile, in a polystyrene/acrylonitrile matrix) do not have these disadvantages since acrylic rubber contains no double bonds sensitive to weatherings. Accordingly, shaped articles made of ASA are extremely stable to ageing and weathering. ASA molding materials are described, for example, in German laid-open application DOS 1,260,135.

The disadvantage of shaped articles of ASA is that their mechanical properties are inadequate for some applications, in particular the low-temperature impact strength, which is lower than that of shaped articles made of ABS (owing to the higher Tg of the Tg of the polyacrylate rubbers).

German laid-open application DOS 2,901,576 discloses molding materials which consist of an SAN matrix, or polybutadiene rubber grafted with SAN and having an average particle size $d_{50}$ of from 200 to 450 nm, and a small-particle polyalkyl acrylate rubber grafted with SAN and having an average particle size $d_{50}$ of from 50 to 150 nm. Such molding materials are not completely satisfactory with regard to their mechanical properties and in particular their stability to weathering (tendency to yellow).

EP-A 52 732 discloses molding materials comprising an SAN matrix, a course-particle polybutadiene rubber grafted with SAN and having an average particle diameter $d_{50}$ of from 500 to 5000 nm, and a polyalkyl acrylate or polybutadiene rubber grafted with SAN and having an average particle diameter $d_{50}$ of from 50 to 180 nm on the one hand and from 250 to 600 nm on the other. These molding materials, too, are not completely satisfactory with regard to their stability to weathering.

It is an object of the present invention to remedy the disadvantages described. In particular, it is intended to provide molding materials having good flowability, from which shaped articles having good mechanical properties and sufficient stability to ageing and to weathering can be produced, in particular shaped articles having a balanced ratio of impact strength and a tendency to yellow.

We have found that this object is achieved by the thermoplastic molding materials defined at the outset. We have also found the use of the molding materials for the production of special shaped articles, and special shaped articles consisting of the molding materials.

Component A) of the novel molding material is present in an amount of from 72 to 88.5, preferably from 73 to 85, particularly preferably from 75 to 83, % by weight, based on the sum of components A), B), C) and D). Component A) is a thermoplastic polymer which consists of a₁) from 50 to 100, preferably from 55 to 95, particularly preferably from 60 to 85, % by weight of styrene or α-methylstyrene or mixtures thereof, a₂) from 0 to 50, preferably from 5 to 45, particularly preferably from 15 to 40, % by weight of acrylonitrile and a₃) from 0 to 50, preferably from 0 to 40, % by weight of one or more further monoethylenically unsaturated monomers, the percentages in each case based on component A). The monomers stated further below for component b13) are suitable as further monomers a3), the monomers a1) and a2) of course being excluded from the list of the monomers b13).

The polymers A) which, owing to their main component styrene and acrylonitrile, are generally also referred to as SAN polymers, are known and some of them are also commercially available. They have, as a rule, a viscosity number VN (determined according to DIN 53 726 at 25° C., 0.5% by weight dimethylformamide) of from 40 to 160 ml/g, corresponding to a weight average molecular weight of from about 40000 to 2000000. They are obtained in a known manner by mass, solution, suspension, precipitation or emulsion polymerization. Details of these processes are described, for example in Kunststoffhandbuch, published by R. Vieweg and G. Daumiller, vol. V "Polystyrol", Carl-Hanser-Verlag Munich 1969, page 118 et seq.

Component B) of the molding material is present in an amount of from 10 to 20, preferably from 12 to 18, particularly preferably from 12.5 to 17, % by weight, based on the sum of the components, A), B), C) and D).

Component B) is a first graft polymer having an average particle diameter $d_{50}$ of from 400 to 600 nm, comprising, based on B), b1) from 30 to 90, preferably from 40 to 80, particularly preferably from 45 to 75, % by weight of a rubber-elastic graft core b1) and b2) from 10 to 70, preferably from 20 to 65, particularly preferably from 25 to 60, % by weight of a graft shell b2).

The graft core b1) is composed of, based on b1), b11) from 80 to 99.99, preferably from 85 to 99.5, particularly preferably from 90 to 99, % by weight of n-butyl acrylate, b12) from 0.001 to 20, preferably from 0.5 to 10, particularly preferably from 1 to 5, % by weight of at least one crosslinking monomer and, b13) from 0 to 40, preferably from 0 to 20, particularly preferably from 0 to 10, % by weight of one or more further monoethylenically unsaturated monomers.

Crosslinking monomers b12) are bi- or polyfunctional comonomers, for example butadiene and isoprene, divinyl esters of dicarboxylic acids, for example of succinic acid and adipic acid, diallyl and divinyl ethers of bifunctional alcohols, for example of ethylene glycol and of butane-1,4-diol, diesters of acrylic acid and methacrylic acid with the stated bifunctional alcohols, 1,4-divinylbenzene and triallyl cyanurate. The acrylate of tricyclodecenyl alcohol of the formula

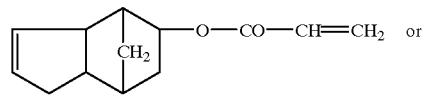 or

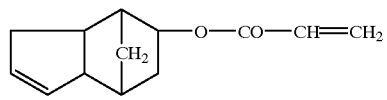

which is known under the name dihydrodicyclopentadienyl acrylate, and the allyl esters of acrylic acid and of methacrylic acid are particularly preferred.

Component b1) of the molding materials may furthermore contain, at the expense of the monomers b11) and b12), further monomers b13) which vary the mechanical and thermal properties of the core within a certain range. Examples of such monoethylenically unsaturated comonomers are:

vinylaromatic monomers, such as styrene, styrene derivatives of the general formula I

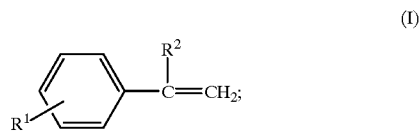

where $R^1$ and $R^2$ are each hydrogen or $C_1$–$C_8$-alkyl;

methacrylonitrile, acrylonitrile;

acrylic acid, methacrylic acid, and dicarboxylic acids such as maleic acid and fumaric acid, and the anhydrides thereof, such as maleic anhydride;

Monomers having functional nitrogen groups, such as dimethylaminoethyl acrylate, diethylaminoethyl acrylate, vinylimidazol, vinylpyrrolidone, vinylcaprolactam, vinylcarbazol, vinylaniline and acrylamide;

$C_1$–$C_{10}$-alkyl esters of acrylic acid and of methacrylic acid, such as methyl(meth)acrylate, ethyl(meth)acrylate, n-propyl(meth)acrylate, isopropyl(meth)acrylate, n-butyl(meth)acrylate, isobutyl(meth)acrylate, sec-butyl(meth)acrylate, tert-butyl(meth)acrylate, ethylhexyl(meth)acrylate and hydroxyethyl acrylate;

aromatic and araliphatic esters of acrylic acid and methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

N-substituted maleimides, such as N-methyl-, N-phenyl- and N-cyclohexylmaleimide;

unsaturated ethers, such as vinyl methyl ether and mixtures of these monomers.

The graft shell b2) is composed of, based on b2), b21) from 50 to 100, preferably from 55 to 95, particularly preferably from 60 to 90, % by weight of styrene or α-methylstyrene or mixtures thereof, b22) from 0 to 50, preferably from 5 to 45, particularly preferably from 10 to 40, % by weight of acrylonitrile, and b23) from 0 to 50, preferably from 0 to 40, particularly preferably from 0 to 20, % by weight of one or more further monoethylenically unsaturated monomers.

Suitable further monomers b23) are the monomers stated further above according to b13), the monomers b21) and b22) of course being excluded from the list of the monomers b13).

The graft polymers B) are obtainable in a manner known per se, preferably by emulsion polymerization at from 30 to 80° C. Examples of suitable emulsifiers for this purpose are alkali metal salts of alkenesulfonic or alkylarylsulfonic acids, alkyl sulfates, fatty alcohol sulfonates, salts of higher fatty acids of 10 to 30 carbon atoms, sulfosuccinates, ether sulfonates or resin soaps. The alkali metal salts of alkanesulfonates or fatty acids of 10 to 18 carbon atoms are preferably used.

For the preparation of the dispersion, water is preferably used in an amount such that the prepared dispersion has a solids content of from 20 to 50% by weight.

Preferred polymerization initiators are free radical initiators, for example peroxides, preferably peroxosulfates (for example potassium persulfate) and azo compounds, such as azobisisobutyronitrile. However, redox systems may also be used, in particular those based on hydroperoxides, such as cumyl hydroperoxide.

Molecular weight regulators, e.g. ethylhexyl thioglycolate, tert-dodecyl mercaptan, terpinols and dimeric α-methylstyrene, may furthermore be present.

In order to maintain a constant pH, which is preferably from 6 to 9, buffer substances, such as $Na_2HPO_4/NaH_2PO_4$ or sodium bicarbonate, may be present.

Emulsifiers, initiators, regulators and buffer substances are used in conventional amounts, so that further information in this respect is unnecessary.

The graft core can also particularly preferably be prepared by polymerizing the monomers b1) in the presence of a finely divided rubber latex (i.e. seed latex polymerization procedure).

In principle, it is also possible to prepare the graft core b1) by a process other than emulsion polymerization, for example by mass or solution polymerization, and subsequently to emulsify the polymers obtained. Microsuspension polymerization is also suitable, oil-soluble initiators, such as lauroyl peroxide and tert-butyl perpivalate, preferably being used. The relevant processes are known.

The preparation of the graft shell b2) can be carried out under the same conditions as the preparation of the graft core b1), and the shell b2) can be prepared in one or more process steps. For example, first styrene or α-methylstyrene alone and then styrene and acrylonitrile can be polymerized in two successive steps. Further details of the preparation of the graft polymers B) are described in German laid-open applications DOS 1,260,135 and DOS 3,149,358.

The reaction conditions are matched with one another in a manner known per se so that the polymer particles B) have a uniform diameter $d_{50}$ from 400 to 600 nm, in particular from 450 to 550 nm.

Component C) of the molding materials is present in an amount of 1.5 to 8, preferably from 2 to 7, particularly preferably from 2.5 to 6, % by weight, based on the sum of the components A), B), C) and D).

Component C) is a second graft polymer have a bimodal particle size distribution, the average particle diameter $d_{50}$ being from 25 to 200 nm on the one hand and from 350 to 550 nm on the other hand, comprising, based on C), c1) from 30 to 90, preferably from 35 to 85, particularly preferably from 40 to 75, % by weight of a rubber-elastic graft core c1) and c2) from 10 to 70, preferably from 15 to 65, particularly preferably from 25 to 60, % by weight of a graft shell c2).

The graft core c1) is composed of, based on c1), c11) from 50 to 100, preferably from 80 to 100, particularly preferably from 100, % by weight of butadiene or isoprene or mixtures thereof and c12) from 0 to 50, preferably from 0 to 20, particularly preferably 0, % by weight of one or more further monoethylenically unsaturated monomers.

The graft shell c2) is composed of, based on c2), c21) from 50 to 100, preferably from 55 to 95, particularly preferably from 60 to 90, % by weight of styrene, α-methylstyrene or mixtures thereof, c22) from 0 to 50, preferably from 5 to 45, particularly preferably from 10 to 40, % by weight of acrylonitrile and c23) from 0 to 50, preferably from 0 to 40, particularly preferably from 0 to 20, % by weight of one or more further monoethylenically unsaturated monomers.

Suitable further monomers c23) are the monomers stated further above for component b13).

The graft shell c2) is accordingly defined as described under b2). However, it is quite possible for the graft shells b2) and c2) to differ with regard to the type and amount of the monomers used.

The statements made further above in connection with the preparation of the graft polymers B) are as a rule applicable to the preparation of the graft polymers C), with the exception of the particle diameter.

The reaction conditions are matched with one another so that the polymer particles C) have a bimodal particle size distribution, i.e., the size distribution having two maxima. The average particle diameters $d_{50}$ are from 25 to 200 am, preferably from 60 to 140 nm, particularly preferably from 70 to 120 nm, on the one hand, and from 350 to 550 nm, preferably from 400 to 500 nm, particularly preferably from 430 to 470 nm, on the other hand. Details are described in German laid-open application DOS 2,427,960.

For example, the following procedure may be adopted: the monomers c1) which form the core are polymerized to a conversion of, usually, at least 90%, preferably at least 95%, based on the monomers used. This conversion is reached, as a rule, after from 4 to 20 hours.

The rubber latex obtained in this manner has an average particle size $d_{50}$ of not more than 200 nm and a narrow particle size distribution (virtually monodisperse system).

In the second stage, the rubber latex is agglomerated. This is done, as a rule, by adding a dispersion of an acrylate polymer. Preferably, dispersions of copolymers of acrylates of alcohols of 1 to 4 carbon atoms, preferably of ethyl acrylate, with from 0.1 to 10% by weight, of monomers forming water-soluble polymers, e.g. acrylic acid, methacrylic acid, acrylamide or methacrylamide, N-methylolmethacrylamide or N-vinylpyrrolidone, are used. A copolymer of 96% of ethyl acrylate and 4% of methacrylamide is particularly preferred. The agglomerating dispersion can, if desired, also contain a plurality of the stated acrylate polymers.

The concentration of the acrylate polymers in the dispersion should in general be from 3 to 40% by weight. In the agglomeration, from 0.2 to 20, preferably from 1 to 5, parts by weight of the agglomerating dispersion are used per 100 parts by weight of the rubber latex, calculated in each case relative to solids. The agglomeration is carried out by adding the agglomerating dispersion to the rubber. The rate of the addition is usually not critical, the addition generally lasting for from about 1 to 30 minutes at from 20 and 90° C., preferably from 30 and 75° C.

Under the stated conditions, only some of the rubber particles are agglomerated, resulting in a bimodal distribution. After the agglomeration, in general more than 50, preferably from 75 to 95, % of the particles (numerical distribution) are present in the nonagglomerated state. The partially agglomerated rubber latex obtained is relatively stable so that it can be directly stored and transported without coagulation occurring.

The core c1) is grafted with the graft shell c2) in a manner known per se, for example in the same system as the preparation of the graft core c1).

If ungrafted monomers are formed from the monomers b2) and c2) in the grafting of the cores b1) and c1), respectively, these amounts, which as a rule are less than 10% by weight of b2) and c2), are assigned to the mass of the components B) and C), respectively.

According to the invention, the sum of the graft polymers B) and C) is from 11.5 to 25, preferably from 15 to 24, particularly preferably from 16 to 22, % by weight, based on the sum of the three components A), B) and C).

Component D) of the molding materials is present in an amount of from 0 to 50, preferably from 0 to 20, particularly preferably from 0 to 10, % by weight, based on the sum of the components A), B), C) and D).

Component D) comprises lubricants or mold release agents, pigments, dyes, flameproofing agents, antioxidants, light stabilizers, fibrous and pulverulent fillers or reinforcing materials or antistatic agents and other additives or mixtures thereof.

Suitable lubricants and mold release agents are, for example, stearic acids, stearyl alcohol, stearates or stearamides, as well as silicone oils, montan waxes and those based on polyethylene and polypropylene.

Pigments are, for example, titanium dioxide, phthalocyanines, ultramarine blue, iron oxides or carbon black, as well as the class consisting of the organic pigments.

Dyes are to be understood as meaning all dyes which can be used for transparent, semitransparent or nontransparent colouring of polymers, in particular those which are suitable for coloring styrene copolymers. Such dyes are known to a person skilled in the art.

For example, the halogen-containing or phosphorus-containing compounds known to a person skilled in the art, magnesium hydroxide and other conventional compounds or mixtures thereof may be used as flameproofing agents.

Suitable antioxidants (heat stabilizers) are, for example, stearically hindered phenols, hydroquinones, various substituted members of this group and mixtures thereof. They are commercially available, for example as Topanol® or Irganox®.

Suitable light stabilizers are, for example, various substituted resorcinols, salicylates, benzotriazoles, benzophenones and HALS (Hindered Amine Light Stabilizers), as commercially available, for example, as Tinuvin®.

Examples of fibrous or pulverulent fillers are carbon fibers or glass fibers in the form of woven glass fabrics, glass mats or glass rovings, chopped glass, glass beads and wollastonite, particular preferably glass fibers. If glass fibers are used, they may be provided with a size and an adhesion promoter to improve the compatibility with the blend components. The glass fibers can be incorporated both in the form of short glass fibers and in the form of rovings.

Suitable particulate fillers are carbon black, amorphous silica, magnesium carbonate (chalk), powdered quartz, mica, bentonite, talc, feldspar and in particular calcium silicates, such as wollastonite and kaolin.

Examples of suitable antistatic agents are amine derivatives, such as N,N-bis(hydroxyalkyl) alkylamines, N,N-bis(hydroxyalkyl) alkyleneamines, polyethylene glycol esters and glyceryl mono- and distearates and mixtures thereof.

Individual additives are used in the usual amounts in each case, so that further information in this connection is unnecessary.

The novel molding materials can be prepared by mixing methods known per se, for example with melting in an extruder, Banbury mixer, kneader, roll mill or calendar. However, the components can also be used cold and the powder mixture or mixture consisting of granules is not melted or homogenized until the processing stage.

The molding materials can be converted into moldings of all kinds, in particular injection moldings, very particularly those having complex geometries, such as housing parts or electric switches. The novel molding materials can furthermore be used for the production of front panels for household appliances, for the production of panels, switches or covers in the electrical sector or for the production of installation boxes for outdoor electrical apparatuses. The shaped articles are distinguished by a combination of high stability to weathering (little tendency to yellow) and good mechanical properties (high impact strength).

The stated average particle size d is the weight average particle size as determined by means of an analytical ultracentrifuge according to the method of W. Scholtan and H. Lange, Kolloid-Z. und Z.-Polymere 250 (1972) 782–796. The ultracentrifuge measurement gives the integral mass distribution of the particle diameter of samples. From this it is possible to determine the percentage by weight of the particles which have a diameter equal to or less than a certain size.

The $d_{10}$-value indicates the particle diameter at which 10% by weight of all particles have a smaller diameter and 90% by weight a larger diameter. Conversely, it is true for the $d_{90}$-value that 90% by weight of all particles have a smaller diameter, and 10% by weight a larger diameter, than the diameter which corresponds to the $d_{90}$-value. The weight average particle diameter $d_{50}$ or volume average particle diameter $D_{50}$ indicates the particle diameter at which 50% by weight or % by volume, respectively, of all particles have a larger diameter and 50% by weight or % by volume, respectively, have a smaller particle diameter. $d_{10}$-, $d_{50}$- and $d_{90}$-values characterize the width Q of the particle size distribution, where $Q=(d_{90}-d_{10})/d_{50}$. The smaller Q, the narrower is the distribution.

EXAMPLES

Preparation of a Component A
Copolymer of Styrene and Acrylonitrile

A copolymer of 65% by weight of styrene and 35% by weight of acrylonitrile was prepared by the continuous solution polymerization method as described in Kunststoff-Handbuch, publishers R. Vieweg and G. Daumiller, vol. V "Polystyrol", Carl-Hanser-Verlag Munich 1969, pages 122 to 124. The viscosity number VN (determined according to DIN 53 726 at 25° C., 0.5% by weight in dimethylformamide) was 64 ml/g.

Preparation of a Component B
First Graft Polymer of Crosslinked Poly-n-butylacrylate (core) and Polystyrene/acrylonitrile(shell)

A mixture of 98 g of n-butyl acrylate and 2 g of dihydroxydicyclopentadienyl acrylate and, separately therefrom, a solution of 1 g of sodium $C_{12}$–$C_{18}$-paraffinsulfonate in 50 g of water were added, in the course of 4 hours at 60° C., to a mixture of 3 g of a polybutyl acrylate seed latex, 100 g of water and 0.2 g of potassium persulfate. The polymerization was then continued for a further 3 hours. The average particle diameter $d_{50}$ of the resulting latex was 430 nm, the particle size distribution being narrow (Q=0.1). The solids content was 40%.

150 g of this latex were mixed with 60 g of water, 0.03 g of potassium persulfate and 0.05 g of lauroyl peroxide, after which first 20 g of styrene and then, in the course of a further 4 hours, a mixture of 15 g of styrene and 5 g of acrylonitrile were grafted onto the latex particles in the course of 3 hours at 65° C. Thereafter, the polymer was precipitated with a calcium chloride solution at 95° C., isolated, washed with water and dried in a warm air stream. The degree of grafting of the polymer was 35% and the particles had an average diameter $d_{50}$ of 510 nm.

The seed polymer initially used was prepared by the process of EP-B 6503 (column 12, line 55, to column 13, line 22) by polymerization of n-butyl acrylate and tricyclodecenyl acrylate in aqueous emulsion and had a solids content of 40%.

Preparation of a Component C
Second Graft Polymer of Polybutadiene (core) and Polystyrene/acrylonitrile (shell)

Preparation of the Polybutadiene Emulsion 0.5 g of tert-dodecyl mercaptan and 16.6 g of butadiene were added to a mixture of 150 g of water, 1.2 g of sodium $C_{12}$–$C_{18}$-paraffinsulfonate, 0.3 g of potassium persulfate, 0.3 g of sodium bicarbonate and 0.15 g of sodium pyrophosphate at 65° C.

After 1 hour, a further 83.3 g of butadiene were metered in over 5 hours. 5 hours after the end of the butadiene addition, 0.5 g of tert-dodecyl mercaptan was added. After a total reaction time of 19 hours and a conversion of 96%, based on butadiene, the solids content was 39%. The particle size distribution was as follows: $d_{10}$: 60 nm, $d_{50}$: 80 nm, $d_{90}$: 105 µm.

Agglomeration and Grafting 255 g of the polybutadiene emulsion were diluted at 65° C. with 74 g of water, and 30 g of an aqueous dispersion (solids content 10% by weight, based on this dispersion) of a copolymer of 96% by weight of ethyl acrylate and 4% by weight of methacrylamide were added. After the agglomeration, about 80% by number of the polybutadiene particles were in the nonagglomerated state. A broad bimodal particle size distribution was present: $d_{10}$: 79 nm, $d_{50}$: 238 nm, $d_{90}$: 323 nm.

0.13 g of potassium persulfate (as an aqueous 3% strength by weight solution), 0.02 g of tert-dodecyl mercaptan and 11 g of a mixture of 70% by weight of styrene and 30% by weight of acrylonitrile were added at 70° C. to the resulting emulsion. After 10 minutes, a mixture of 39 g of styrene, 17 g of acrylonitrile and 0.1 g of tert-dodecylmercaptan was added in the course of 2 ¾ hours, the temperature increasing to 75° C. After the end of the monomer addition, the reaction was allowed to continue for a further hour. Thereafter, the polymer was precipitated with a calcium chloride solution at 95° C., isolated, washed with water and dried in a warm air stream.

Component D 4 parts by weight, based on 100 parts by weight of the sum of components A), B) and C), of titanium dioxide were used as white pigment.

Preparation of the Blends and of the Moldings

Components A), B), C) and D) were thoroughly mixed in a conventional extruder of the type ZSK 30, from Werner and Pfleiderer, at 250° C. and extruded and granulated.

The granules were injection molded at a melt temperature of 220° C. and a mold temperature of 60° C. to give standard small bars (cf. DIN 53 453). Furthermore, circular discs of 6 cm diameter and 0.2 cm thickness were injection molded at a melt temperature of 250° C. and a mold temperature of 60° C.

Investigation of the Moldings

The impact strength test for determining the impact strengths were carried out on the standard small bars according to DIN 53 453.

To determine the stability to weathering, standard small bars were exposed for 48 and 168 hours in a Xenotest 1200 CPS UV exposure unit according to DIN 53 387 and the impact strength test was then carried out according to DIN 53 453, the unexposed side being subjected to impact.

To determine the tendency to yellow, the yellowness indexes according to DIN 6167 (January 1980) were determined for the circular discs after exposure for 48 hours and 336 hours. The colour measurement was carried out according to DIN 53 236, method B (January 1983). The measurement geometry was 45°/0°, illuminant/standard observer: D65/10°.

The difference in yellowness index is to be understood as meaning the difference from the smallest measured yellowness index of the respective exposure series.

The mixing ratios in the polymer blends and the properties of the moldings produced from them are shown in the table below.

TABLE

| Example | 1 | 2V | 3V | 4V |
|---|---|---|---|---|
| Composition [% by weight]: | | | | |
| A | 83.2 | 83.2 | 66.7 | 71.0 |
| B | 13.8 | 16.8 | 17.5 | — |
| C | 3.0 | — | 15.8 | 29.0 |
| D [parts by weight[1)]] | 4 | 4 | 4 | 4 |
| Properties: | | | | |
| Impact strength $a_n$ (25° C.), [kJ/m²] | | | | |
| before weathering | 63 | 29 | n.d. | n.d. |
| after weathering for 48 h | 49 | 31 | n.d. | 8 |
| after weathering for 168 h | 28 | 30 | 9 | 6 |
| Difference in yellowness index | | | | |
| after exposure for 48 h | 0 | 0.2 | 0.6 | 0.9 |
| after exposure for 336 h | 3.1 | 0.4 | 7.5 | 10.3 |

[1)]based on 100 parts by weight of the sum of components A), B) and C).
n.d. not determined The shaped articles obtained from novel molding materials (Example 1) show an optimum of high impact strength before weathering, high impact strength after weathering and a low tendency to yellow after exposure.

The difference in the yellowness index of shaped articles containing novel amounts of the bimodal polybutadiene graft rubber (component C) is, after exposure, slightly higher than the difference in the yellowness index of polybutadiene-free shaped articles (Comparative example 2V and Example 1). However, the impact strength of shaped articles produced from novel molding materials prior to weathering is more than twice as high and, after weathering for 168 hours, is still just as good as the impact strength of polybutadiene-free molding materials.

Accordingly, the addition of small amounts of polybutadiene graft rubber considerably increases the toughness at room temperature.

Shaped articles produced from molding materials having a higher content, not according to the invention, of component C) (Comparative Examples 3V and 4V) have, after weathering, a considerably lower impact strength and a substantially higher difference in the yellowness index than shaped articles produced from the novel molding materials.

Although the novel molding materials contain considerably less graft rubber (sum of B) and C)) (Example 1) than Comparative Example 4V, the impact strength after weathering is considerably higher.

We claim:

1. A thermoplastic molding material containing, based on the total weight of the molding material,
    A) from 72 to 88.5% by weight of a thermoplastic polymer of, based on A),
        $a_1$) from 50 to 100% by weight of styrene or α-methylstyrene or mixtures thereof,
        $a_2$) from 0 to 50% by weight of acrylonitrile and
        $a_3$) from 0 to 50% by weight of one or more further mono-ethylenically unsaturated monomers,
    B) from 10 to 20% by weight of a first graft polymer having an average particle diameter $d_{50}$ from 400 to 600 nm, consisting of, based on B),
        $b_1$) from 30 to 90% by weight of a rubber-elastic graft core of, based on $b_1$),
            $b_{11}$) from 80 to 99.99% by weight of n-butyl acrylate,
            $b_{12}$) from 0.01 to 20% by weight of at least one crosslinking monomer selected from the group consisting of dihydrodicyclopentadienyl acrylate, allyl esters of acrylic acid and ally esters of methacrylic acid, and,
            $b_{13}$) from 0 to 40% by weight of one or more further monoethylenically unsaturated monomers, and
        $b_2$) from 10 to 70% by weight of a graft shell of, based on $b_2$),
            $b_{21}$) from 50 to 100% by weight of styrene or α-methylstyrene or mixtures thereof,
            $b_{22}$) from 0 to 50% by weight of acrylonitrile, and
            $b_{23}$) from 0 to 50% by weight of one or more further monoethylenically unsaturated monomers,
    C) from 1.5 to 8% by weight of a second graft polymer having a bimodal particle size distribution, the average particle diameter $d_{50}$ being from 25 to 200 nm on the one hand and from 350 to 550 nm on the other hand, comprising, based on C),
        $c_1$) from 30 to 90% by weight of a rubber-elastic graft core of, based on $c_1$),
            $c_{11}$) from 50 to 100% by weight of butadiene or isoprene or mixtures thereof, and,
            $c_{12}$) from 0 to 50% by weight of one or more further monoethylenically unsaturated monomers, and,
        $c_2$) from 10 to 70% by weight of a graft shell of, based on $c_2$),
            $c_{21}$) from 50 to 100% by weight of styrene or α-methylstyrene or mixtures thereof,
            $c_{22}$) from 0 to 50% by weight of acrylonitrile and,
            $c_{23}$) from 0 to 50% by weight of one or more further monoethylenically unsaturated monomers and
    D) from 0 to 50% by weight of lubricants or mold release agents, pigments, dyes, flameproofing agents, antioxidants, light stabilizers, fibrous or particulate fillers or reinforcing materials or antistatic agents or other additives, or mixtures thereof,
the sum of the graft polymers B) and C) accounting for from 11.5 to 25% by weight of the sum of the three components A), B) and C), and the sum of the four components A) to D) being 100% by weight.

2. A housing part or front panel for household appliances, a panel, switch or cover in the electrical sector or an installation box for outdoor electrical apparatuses obtained from a thermoplastic molding material as claimed in claim 1.

3. The molding material defined in claim 1, wherein the amount of the thermoplastic polymer (A) is of from 73 to 85% by weight, based on the sum of the four components A) to D).

4. The molding material defined in claim 1, wherein the amount of the first graft polymer (B) is of from 12 to 18% by weight, based on the sum of the four components A) to D).

5. The molding material defined in claim 1, wherein the amount of the second graft polymer (C) is of from 2 to 7% by weight, based on the sum of the four components A) to D).

6. The molding material defined in claim 1, wherein the sum of the graft copolymers (B) and (C) amount to from 15 to 24% by weight, based on the sum of components (A) to (C).

7. The molding material defined in claim 1, wherein the sum of the graft copolymers (B) and (C) amount to from 16 to 22% by weight, based on the sum of components (A) to (C).

8. The molding material defined in claim 1, wherein the thermoplastic polymer (A) consists of
    $a_1$) from 55 to 95% by weight of styrene or α-methylstyrene or mixtures thereof,
    a2) from 5 to 45% by weight of acrylonitrile and
    $a_3$) from 0 to 40% by weight of one or more further monoethylenically unsaturated monomers.

9. The molding material defined in claim 1, wherein the second graft polymer (C) comprises, based on (C),
    from 35 to 85% by weight of the rubber-elastic graft core ($c_1$), and
    from 15 to 65% by weight of the graft shell ($c_2$).

10. The molding material defined in claim 1, wherein the second graft polymer (C) comprises, based on (C),
    from 40 to 75% by weight of the rubber-elastic graft core ($c_1$), and
    from 25 to 60% by weight of the graft shell ($c_2$).

11. The molding material defined in claim 1, wherein the rubber-elastic graft core ($c_1$) consists of butadiene or isoprene or mixtures thereof.

12. A thermoplastic molding material containing, based on the total weight of the molding material,
    A) from 72 to 88.5% by weight of a thermoplastic polymer of, based on A),
        $a_1$) from 50 to 100% by weight of styrene or α-methylstyrene or mixtures thereof,
        $a_2$) from 0 to 50% by weight of acrylonitrile and
        $a_3$) from 0 to 50% by weight of one or more further monoethylenically unsaturated monomers,
    B) from 10 to 20% by weight of a first graft polymer having an average particle diameter $d_{50}$ from 400 to 600 nm, consisting of, based on B),
        b1) from 30 to 90% by weight of a rubber-elastic graft core of, based on b1),
            $b_{11}$) from 80 to 99.99% by weight of n-butyl acrylate,
            $b_{12}$) from 0.01 to 20% by weight of at least one crosslinking monomer selected from the group consisting of dihydrodicyclopentadienyl acrylate, allyl esters of acrylic acid and ally esters of methacrylic acid, and,
            $b_{13}$) from 0 to 40% by weight of one or more further monoethylenically unsaturated monomers, and b$_2$) from 10 to 70% by weight of a graft shell of, based on b$_2$),
   b$_{21}$) from 50 to 100% by weight of styrene or α-methylstyrene or mixtures thereof,
   b$_{22}$) from 0 to 50% by weight of acrylonitrile, and
   b$_{23}$) from 0 to 50% by weight of one or more further monoethylenically unsaturated monomers,
C) from 1.5 to 3% by weight of a second graft polymer having a bimodal particle size distribution, the average particle diameter d$_{50}$ being from 25 to 200 nm on the one hand and from 350 to 550 nm on the other hand, comprising, based on C),
   c$_1$) from 30 to 90% by weight of a rubber-elastic graft core of, based on c$_1$),
   c$_{11}$) from 50 to 100% by weight of butadiene or isoprene or mixtures thereof, and,
   c$_{12}$) from 0 to 50% by weight of one or more further monoethylenically unsaturated monomers, and,
   c$_2$) from 10 to 70% by weight of a graft shell of, based on c$_2$),
   c$_{21}$) from 50 to 100% by weight of styrene or α-methylstyrene or mixtures thereof,
   c$_{22}$) from 0 to 50% by weight of acrylonitrile and,
   c$_{23}$) from 0 to 50% by weight of one or more further monoethylenically unsaturated monomers and
D) from 0 to 50% by weight of lubricants or mold release agents, pigments, dyes, flameproofing agents, antioxidants, light stabilizers, fibrous or particulate fillers or reinforcing materials or antistatic agents or other additives, or mixtures thereof,
the sum of the graft polymers B) and C) accounting for from 11.5 to 25% by weight of the sum of the three components A), B) and C), and the sum of the four components A) to D) being 100% by weight.

13. A housing part or front panel for household appliances, a panel, switch or cover in the electrical sector or an installation box for outdoor electrical apparatuses obtained from a thermoplastic molding material as claimed in claim 12.

14. The molding material defined in claim 12, wherein the amount of the thermoplastic polymer (A) is of from 73 to 85% by weight, based on the sum of the four components A) to D).

15. The molding material defined in claim 12, wherein the amount of the first graft polymer (B) is of from 12 to 18% by weight, based on the sum of the four components A) to D).

16. The molding material defined in claim 12, wherein the sum of the graft copolymers (B) and (C) amount to from 15 to 24% by weight, based on the sum of components (A) to (C).

17. The molding material defined in claim 12, wherein the sum of the graft copolymers (B) and (C) amount to from 16 to 22% by weight, based on the sum of components (A) to (C).

18. The molding material defined in claim 12, wherein the thermoplastic polymer (A) consists of
   a$_1$) from 55 to 95% by weight of styrene or α-methylstyrene or mixtures thereof,
   a$_2$) from 5 to 45% by weight of acrylonitrile and
   a$_3$) from 0 to 40% by weight of one or more further monoethylenically unsaturated monomers.

19. The molding material defined in claim 12, wherein the second graft polymer (C) comprises, based on (C),
   from 35 to 85% by weight of the rubber-elastic graft core (c$_1$), and
   from 15 to 65% by weight of the graft shell (c$_2$).

20. The molding material defined in claim 12, wherein the second graft polymer (C) comprises, based on (C),
   from 40 to 75% by weight of the rubber-elastic graft core (c$_1$), and
   from 25 to 60% by weight of the graft shell (c$_2$).

* * * * *